(12) United States Patent
Pearse et al.

(10) Patent No.: US 8,158,010 B2
(45) Date of Patent: Apr. 17, 2012

(54) FILTER SLEEVE FOR ENABLING WASTE WATER DISCHARGE DIRECTLY INTO THE ENVIRONMENT

(76) Inventors: Herb Pearse, Vaughn, WA (US); Mary Peacock, Vaughn, WA (US)

( * ) Notice: Subject to any disclaimer, the term of this patent is extended or adjusted under 35 U.S.C. 154(b) by 0 days.

(21) Appl. No.: 13/171,096

(22) Filed: Jun. 28, 2011

(65) Prior Publication Data

US 2011/0253641 A1 Oct. 20, 2011

Related U.S. Application Data (62) Division of application No. 12/397,332, filed on Mar. 3, 2009, now abandoned.

(51) Int. Cl.
*C02F 1/00* (2006.01)
*B01D 37/00* (2006.01)
(52) U.S. Cl. ............... 210/747.1; 210/747.5; 210/747.9; 210/799
(58) Field of Classification Search .................... None
See application file for complete search history.

(56) References Cited

U.S. PATENT DOCUMENTS

| | | | | |
|---|---|---|---|---|
| 415,927 A * | 11/1889 | Stiles | | 210/220 |
| 615,847 A * | 12/1898 | Hansen | | 210/460 |
| 705,364 A * | 7/1902 | Kurtz | | 210/170.01 |
| 2,503,455 A * | 4/1950 | Sheren | | 210/318 |
| 2,512,877 A * | 6/1950 | Rike | | 210/172.2 |
| 3,206,036 A * | 9/1965 | Hawley | | 210/460 |
| 3,722,686 A * | 3/1973 | Arnett et al. | | 210/170.09 |
| 3,744,640 A * | 7/1973 | Grover | | 210/463 |
| 3,799,217 A * | 3/1974 | Bauer | | 141/1 |
| 4,179,379 A * | 12/1979 | Mitchell | | 210/242.1 |
| 4,180,348 A * | 12/1979 | Taylor | | 405/39 |
| 4,260,284 A * | 4/1981 | Huart | | 405/43 |
| 4,358,218 A * | 11/1982 | Graham | | 405/60 |
| 4,541,209 A * | 9/1985 | Hoag | | 52/20 |
| 4,618,422 A * | 10/1986 | Sasaki et al. | | 210/172.3 |
| 4,709,120 A * | 11/1987 | Pearson | | 174/16.1 |
| 4,973,403 A * | 11/1990 | Kozey | | 210/170.09 |
| 4,988,235 A * | 1/1991 | Hurley | | 405/50 |
| 5,035,536 A * | 7/1991 | von Winckelmann | | 405/60 |
| 5,071,286 A * | 12/1991 | Separovich | | 405/66 |
| 5,082,013 A * | 1/1992 | Scheib | | 137/1 |
| 5,232,310 A * | 8/1993 | Wirkala | | 405/68 |
| 5,269,338 A * | 12/1993 | Figas | | 137/140 |
| 5,283,979 A * | 2/1994 | Carlson et al. | | 49/395 |
| 5,297,895 A * | 3/1994 | Johnson | | 405/41 |
| 5,345,741 A * | 9/1994 | Slater et al. | | 52/646 |
| 5,435,464 A * | 7/1995 | Alexander et al. | | 222/105 |
| 5,496,468 A * | 3/1996 | Cormier | | 210/172.3 |

(Continued)

*Primary Examiner* — Robert James Popovics
(74) *Attorney, Agent, or Firm* — Daniel L. Dawes; Marcus C. Dawes (57) ABSTRACT

A filter sleeve is fabricated from a variety of media selected to preferentially remove particulates and specific contaminants from water or other liquids. The layers of the filter sleeve may be configured to remove 1-micron particulates, while another layer or layers may be configured to remove a range of petroleum hydrocarbons, fats, oils, and greases, while yet another layer may be configured to remove metals, and yet another layer could be configured to remove bacteria, algae, mold, and fungus. Filter sleeves that are configured to remove different particulate sizes and contaminants can be used simultaneously by placing the filter sleeves inside one another to accrue the capabilities of several individual filter sleeves as one unit. The filter sleeve can be used to remove particulates and hydrocarbons from waste water accumulated in underground vaults, enabling such waste water to be discharged directly into the ambient environment.

6 Claims, 5 Drawing Sheets

U.S. PATENT DOCUMENTS

| | | | | |
|---|---|---|---|---|
| 5,509,437 A * | 4/1996 | Merrett | ............ | 137/15.02 |
| 5,723,044 A * | 3/1998 | Gleason et al. | ............ | 210/170.09 |
| 5,843,306 A * | 12/1998 | Singleton | ............ | 210/163 |
| 6,051,131 A * | 4/2000 | Maxson | ............ | 210/162 |
| 6,051,132 A * | 4/2000 | Flores | ............ | 210/167.21 |
| 6,059,964 A * | 5/2000 | Strawser, Sr. | ............ | 210/164 |
| 6,066,253 A * | 5/2000 | Idland et al. | ............ | 210/167.1 |
| 6,089,790 A * | 7/2000 | Berry et al. | ............ | 405/127 |
| 6,304,444 B1 * | 10/2001 | Combs et al. | ............ | 361/695 |
| 6,386,049 B1 * | 5/2002 | Schrumm | ............ | 73/861.66 |
| 6,401,829 B1 * | 6/2002 | Newton | ............ | 169/24 |
| 6,406,218 B1 * | 6/2002 | Olson | ............ | 405/36 |
| 6,467,424 B1 * | 10/2002 | Yates et al. | ............ | 114/312 |
| 6,638,435 B2 * | 10/2003 | Loreno | ............ | 210/767 |
| 6,682,651 B1 * | 1/2004 | Toland et al. | ............ | 210/155 |
| 6,712,959 B2 * | 3/2004 | Ekholm et al. | ............ | 210/162 |
| 6,749,366 B1 * | 6/2004 | Chinn et al. | ............ | 405/41 |
| 6,764,596 B2 * | 7/2004 | Tucker | ............ | 210/162 |
| 6,772,566 B1 * | 8/2004 | Machledt et al. | ............ | 52/169.6 |
| D499,166 S * | 11/2004 | Weidmann | ............ | D23/209 |
| 6,922,953 B1 * | 8/2005 | Lewis | ............ | 52/126.1 |
| 6,926,464 B1 * | 8/2005 | Weidmann | ............ | 405/40 |
| 6,949,198 B2 * | 9/2005 | Reber | ............ | 210/747.5 |
| 6,953,528 B2 * | 10/2005 | Nesfield | ............ | 210/747.5 |
| 7,475,515 B2 * | 1/2009 | Machledt et al. | ............ | 52/169.7 |
| 7,540,953 B2 * | 6/2009 | Fitzgerald | ............ | 210/162 |
| 7,575,677 B1 * | 8/2009 | Barnes | ............ | 210/232 |
| 7,950,527 B2 * | 5/2011 | Osborne et al. | ............ | 210/483 |
| 2003/0010727 A1 * | 1/2003 | Gunderson, III | ............ | 210/803 |
| 2003/0029780 A1 * | 2/2003 | Ekholm et al. | ............ | 210/162 |
| 2005/0000175 A1 * | 1/2005 | Machledt et al. | ............ | 52/220.1 |
| 2005/0130621 A1 * | 6/2005 | Flynn | ............ | 455/347 |
| 2006/0180531 A1 * | 8/2006 | Bonifer | ............ | 210/169 |
| 2007/0175834 A1 * | 8/2007 | Osborne et al. | ............ | 210/767 |
| 2007/0267340 A1 * | 11/2007 | Bleigh et al. | ............ | 210/486 |
| 2008/0031743 A1 * | 2/2008 | Pappalardo et al. | ............ | 417/231 |
| 2008/0061010 A1 * | 3/2008 | Tom | ............ | 210/767 |
| 2008/0164221 A1 * | 7/2008 | Brownstein et al. | ............ | 210/767 |
| 2008/0251470 A1 * | 10/2008 | Kent | ............ | 210/791 |
| 2009/0288717 A1 * | 11/2009 | Lenox | ............ | 137/362 |
| 2011/0253641 A1 * | 10/2011 | Pearse et al. | ............ | 210/747.3 |

\* cited by examiner

FILTER SLEEVE FOR ENABLING WASTE WATER DISCHARGE DIRECTLY INTO THE ENVIRONMENT

BACKGROUND OF THE INVENTION

Waste water is pervasive in our environment and can be generated by diverse sources ranging from stormwater or runoff water which carries surface contaminants such as petroleum hydrocarbons, metals, particulate matter and bacteria directly to natural or man-made impoundments to the more severe discharges of water contaminated with chemical and radioactive waste. Industrial complexes and municipalities must treat relatively large volumes of waste water on a regular basis. In many cases, industrial complexes, factories and municipalities must build permanent water treatment systems for their waste water. In many cases waste water accumulates in man-made impoundments such as underground electrical vaults, secondary containment vaults for underground storage tanks, equipment vaults, sumps, catch basins and storm water retention ponds. As our environment becomes more contaminated, regulatory agencies are imposing restrictions and establishing regulations that preclude discharging anything but minimally contaminated waste water directly into the environment. Options are limited for facilities that do not have an on-site water treatment system and these facilities must either make arrangements to have contaminated waste water transported to an appropriate treatment facility or make arrangements for highly restricted discharge to a sanitary sewer system. Municipal waste water treatment facilities have strict rules with respect to the types of waste water that is allowed into the sewers and as contaminant levels increase, rules are becoming more stringent. Alternative treatment sites are available in some cases but transportation and treatment costs can be significant. There are situations where some waste water streams cannot be discharged into a sewer system or discharged directly to the environment because of environmental regulations or appearances. In many of these situations the contamination is so minimal that transportation to a hazardous waste treatment and disposal site is impractical.

In many situations industrial waste water is generated during construction activities and in most cases that contamination, generally in the form of sediments and small debris, is relatively minimal. There are many approaches to the control of contaminated water generated at construction sites and these approaches range from man-made impoundments to filter socks used to provide crude removal of coarse sediments. However, much of the contaminants generated at construction sites migrate off-site via construction vehicles entering and exiting the site as well as windblown fine particulate matter that mixes with surface water. This contamination that has migrated off site finds its way into below ground structures such as utility and containment vaults.

Filter socks used at construction sites are generally fabricated out of a heavy duty porous fabric with a large apparent opening size which allows mud and rock particles to be discharged into the environment. Conventional filter socks are not suitable for removing fine particles from waste water.

Filter socks do not reliably remove substantial contaminant concentrations. For this reason, it would be desirable to implement a technology that provides the ability to treat waste water contaminated with particulate matter and other prevalent contaminants such as hydrocarbons in an efficient manner that allows the discharge of that treated waste water directly into the environment. Underground electrical vaults and other man-made areas where water accumulates are prone to collecting particulate matter, contaminated water, and other liquids. The current methods employed to address this waste water is to remove that water from any given location with a vacuum truck or other type of pumping and containment vessel and to transport that water off-site for treatment and disposal or, the more complicated process of bringing portable waste water treatment equipment to the site to treat the water. It would be particularly desirable to provide a method capable of providing filtration of waste water for the removal of fine particulate matter, contamination, and associated discoloration so that the water can be discharged directly to the environment with little or no aesthetic or environmental impact.

Disclosed herein is a filter sleeve that can be configured to remove fine particulate matter as well as a range of other contaminants, including but not limited to, hydrocarbons from waste water, so that after filtering, the waste water can be discharged directly to the environment, or made acceptable for discharge into a sanitary sewer system. Current technologies that are employed to address many waste water issues are either relatively ineffective or prohibitively expensive. The filter sleeve can provide filtered removal of sub-micron particulates and it can be configured to remove a spectrum of contaminants, including but not limited to, hydrocarbons and metals from waste water and it can perform these tasks far more efficiently and at considerably lower cost than most current practices.

In one exemplary embodiment, the multi-layer filter sleeve is fabricated from media selected to preferentially remove certain contaminants. For example, in one exemplary embodiment, one layer of the filter sleeve removes particulates larger than 1 micron in size. A second layer removes hydrocarbons and a third layer is in itself composed of a multi-layered composite of porous, granular and reactive media. Adjacent edges of the filtration media can be sewn, sealed, or otherwise bonded together to create a cylindrical structure with openings on each end. In an alternative embodiment the bottom end of the cylinder is closed or sewn shut as well, particularly in those applications where bottom sealing might otherwise be a problem if the cylinder were to be left open. Combination options are relatively unlimited in that filter media can be employed for the removal of a specific particle size and yet another layer, or layers with a different media, can be employed to remove a specific contaminant or contaminants. In other embodiments a plurality of media in layers will be included, since the order and configuration of those layers and media will be chosen as required to remove specific contaminants and particulate sizes.

One or more layers can be implemented in the construction of the filter sleeve and these layers can be composed of diverse filter media in the form of, but not limited to, woven fabric, non-woven fabric, screen cloth, felted material and other media as may be necessary to meet the target filtration requirements.

In some embodiments, the filter sleeve will be implemented by placing the filter sleeve as a cover over the exterior of a porous supporting structure with the lower portion of the filter sleeve weighted to create a seal at the lower extreme of the supporting structure at the point where the supporting structure interfaces with a base surface. The upper open-ended weighted portion of the filter sleeve in this embodiment would be folded inward over the upper edge of the porous supporting structure to provide support for the filter sleeve on the supporting structure.

In some embodiments, the filter sleeve will be implemented by placing the filter sleeve as a liner in the interior of a porous supporting structure with the lower portion of the filter sleeve weighted to create a seal at the lower inner extreme of the supporting structure at the point where the supporting structure interfaces with a base surface. The upper open-ended weighted portion of the filter sleeve in this embodiment would be folded outward over the upper edge of the porous supporting structure to provide support for the filter sleeve on the supporting structure.

In some embodiments, the filter sleeve will be implemented by placing the filter sleeve as a cover over the exterior of a porous supporting structure with the lower portion of the filter sleeve clamped, tied, or otherwise fastened to create a seal at the lower extreme of the supporting structure at the point where the supporting structure interfaces with a base surface. The upper open-ended weighted portion of the filter sleeve in this embodiment would be clamped, tied, or otherwise fastened at the upper edge of the porous supporting structure to provide support for the filter sleeve on the supporting structure.

In some embodiments, a porous structural support will be included in the interior of, or on the exterior of, the filter sleeve to provide such structural support as proves necessary for any given application.

In another embodiment one end of the filter sleeve can be capped or sealed closed so as to create a pouch covering the exterior, or a pouch lining the interior of the supporting structure.

An exemplary implementation of a multi-layer filter sleeve is for the removal of particulate matter and hydrocarbons from water pumped from underground equipment vaults. Equipment vaults are common in many buildings and along thoroughfares where utilities are plumbed sub-surface. Water that collects in these vaults or chambers from groundwater intrusion or other sources may be contaminated with hydrocarbons of varying types and concentrations depending upon the use for any given vault or chamber. The implementation of a filter sleeve configured to remove hydrocarbons provides the ability to discharge water from these vaults or chambers directly into the environment.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The illustrated embodiments of the invention can be better visualized by turning now to the following drawings wherein like elements are referenced by like numerals.

DESCRIPTION OF THE DRAWINGS

Attendant advantages and diverse aspects of one or more exemplary embodiments and alterations thereto will become clarified through reference to the following detailed description, when combined with the accompanying drawings, wherein:

FIG. 1 further presents an exemplary embodiment showing stitching as one way in which single or multiple layers of media forming the filter sleeve, wherein opposite edges of a generally planar sheet or sheets of media, can be attached together to form a generally cylindrical filter sleeve.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE INVENTION

Exemplary embodiments of the Invention are illustrated in FIGS. 1, 2, 3, 4 and 5. It is intended that the herein disclosed Figs. and embodiments are to be considered illustrative rather than restrictive. No limitation is to be imputed to the examples shown in the drawings and discussed herein regarding the scope of the technology and of the claims that follow.

Figure 1:
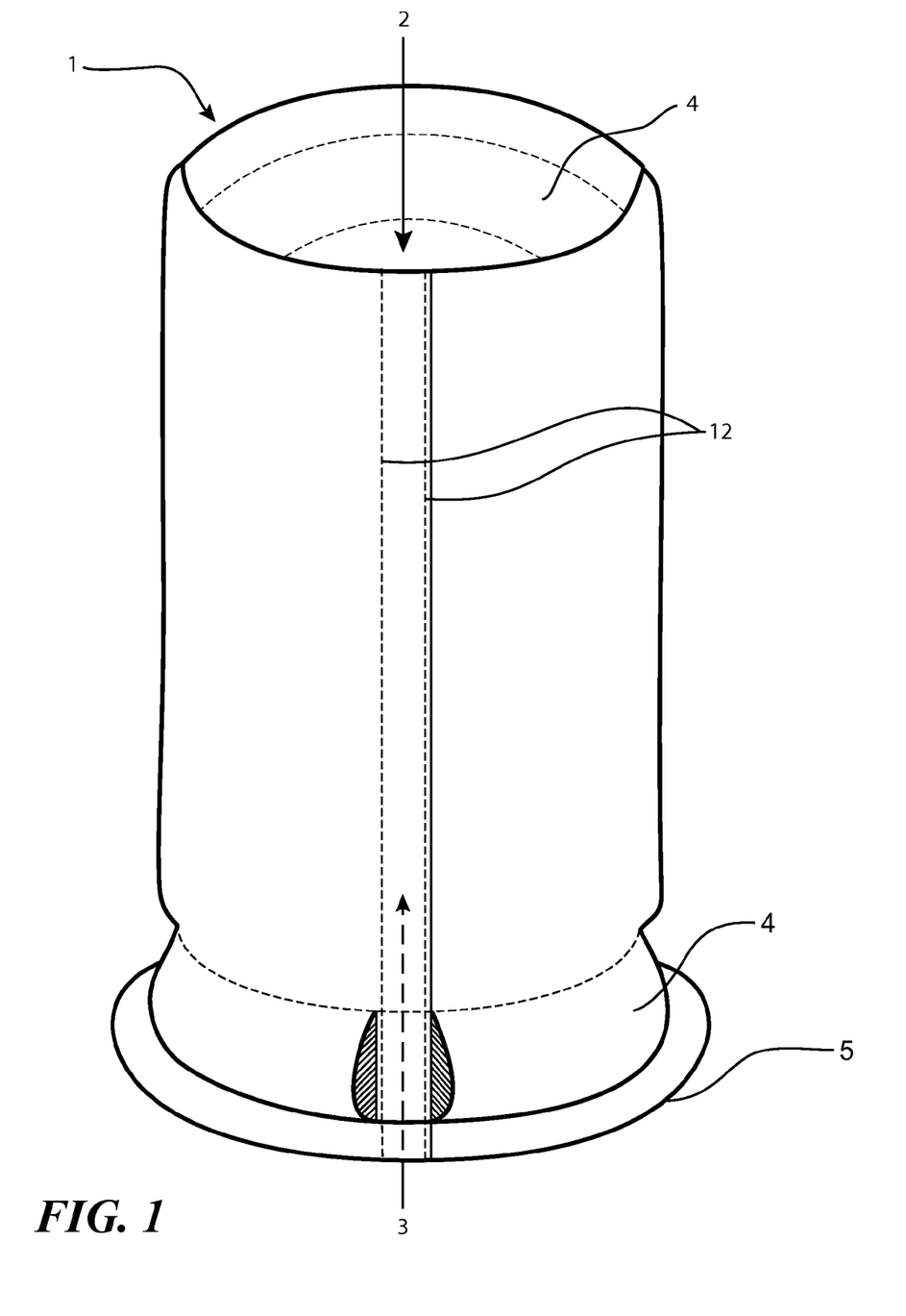
FIG. 1 illustrates a perspective view of the filter sleeve in accordance with the details disclosed herein, which can be constructed with a single layer, or with multiple layers of permeable, semi permeable, or impermeable media with an opening at each end of the illustrated embodiment's cylindrical design with areas adjacent to those openings weighted to facilitate a gravimetric seal at the lower extreme of the filter sleeve, when the filter sleeve is placed over the exterior of, or into the interior of, a supporting structure while the upper weighted opening of the filter sleeve is capable of being folded from the exterior to the interior of the supporting structure or folded from the interior to the exterior of the supporting structure providing retention of the filter sleeve on the supporting structure.

FIG. 1 illustrates a filter sleeve 1 which, in keeping with the concepts and details disclosed herein, includes an opening 2 and an opening 3 on each end of the filter sleeve's 1 cylindrical shape that allows the filter sleeve 1 to be placed over or into a permeable supporting structure so as to accommodate the filtered flow of a liquid through the single or multiple layers of the filter sleeve 1 from either the interior to the exterior or from the exterior to the interior of the filter sleeve 1. The filter sleeve includes one or more layers specifically configured to remove one or more of fine particulates or other contaminants from a liquid stream. Areas adjacent to the openings 2 and 3 can be weighted 4 to facilitate a gravimetric seal 5 at the lower extreme of the filter sleeve when the filter sleeve is placed over the exterior of, or into the interior of, a supporting structure while the upper weighted opening 2 of the filter sleeve is capable of being folded from the exterior to the interior of the supporting structure or folded from the interior to the exterior of the supporting structure providing retention of the filter sleeve on the supporting structure. The filter sleeve can be alternatively held in place on the supporting structure without weighted areas at either or both openings by clamps, ties, flanges or other physical retention devices that insure a seal is formed at the interface of the lower portion of the filter sleeve and the supporting structure and further insure that support of the filter sleeve is provided at the interface of the upper portion of the filter sleeve and the supporting structure. FIG. 1 presents an exemplary embodiment showing stitching 12 as one way in which single or multiple layers of media forming the filter sleeve, wherein opposite edges of a generally planar sheet or sheets of media, can be attached together to form a generally cylindrical filter sleeve 1.

As opposed to weighted areas 4 adjacent to either or both openings 2 and 3, the filter sleeve 1 can be held in place on the supporting structure using a fastener. It should be understood that many types of fasteners can be employed, including but not limited to clamps, adhesives, screws, cordage, and banding material, or methods of manufacture that would configure the filter sleeve and the supporting structure as a single unit.

The length and diameter of filter sleeve 1 can be varied as needed to accommodate the parameters requisite for any specific application or installation. The greater the surface area of the filter sleeve, the greater is the volume of liquids or waste water flow that can be accommodated by the filter sleeve 1. In at least one embodiment, the filter sleeve 1 is portable and can be transported and placed in service by one man.

Filter sleeve 1 can be fabricated starting with a generally planar sheet of application-specific media that can be folded to bring opposing edges into overlapping contact with each other, and then joining the opposing edges together so as to form the filter sleeve's cylindrical shape. The opposed edges can be joined in a variety of ways, including, but not limited to, sewing 12, welding, clamping, bonding or otherwise suitably joining the opposed edges to generate a generally cylindrical filter sleeve 1 open at both ends 2 and 3.

Figure 2:
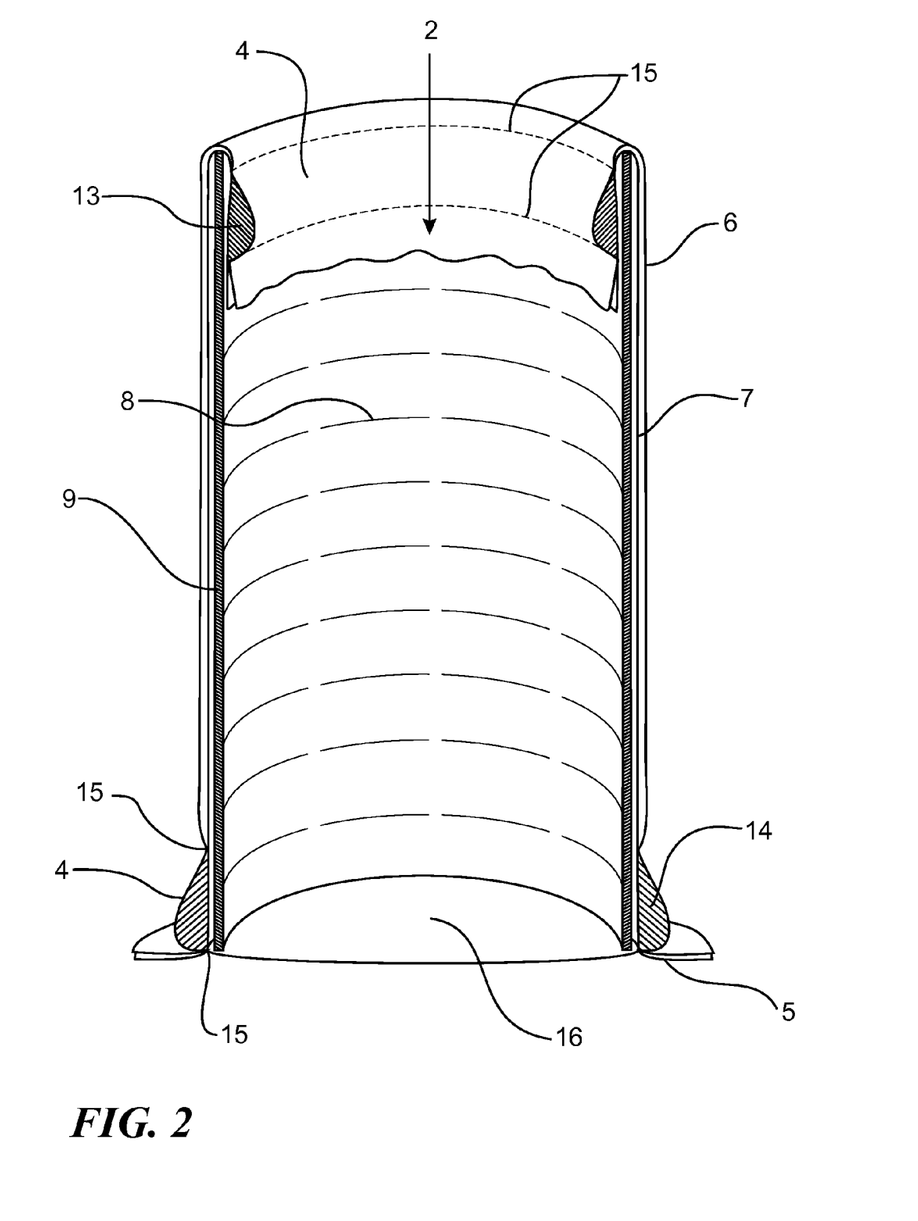
FIG. 2 illustrates a longitudinal cross-sectional view of the filter sleeve detailing multiple layers of permeable media with an opening at each end of the filter sleeve's cylindrical design with areas adjacent to those openings, weighted to facilitate a gravimetric seal at the lower extreme of the filter sleeve when the filter sleeve is placed over the exterior of, or into the interior of, a permeable supporting structure while the upper weighted opening of the filter sleeve is capable of being folded from the exterior to the interior of the supporting structure or folded from the interior to the exterior of the supporting structure providing retention of the filter sleeve on the supporting structure. The gravimetric seal surface can span the lower opening and be configured as a closure, wherein the lower extreme of the filter sleeve is closed using a disk or a shaped piece of the permeable, semi permeable, impermeable, or reactive or granular filtration media used in construction of the filter sleeve or media other than that media used in construction of the filter sleeve or simply by sewing or otherwise closing the lower extreme so as to embody the filter sleeve as a pouch covering the sides and lower extremes of either the interior or exterior or the interior and exterior of a supporting structure.

As shown in FIG. 2 in a cross sectional view of the filter sleeve, the areas adjacent to the open ends 2 and 3 of this generally cylindrical structure have weight pockets 13 and 14 with an adequate amount of a media extending beyond the pocketed areas so as to allow the formation of a seal 5 at the lower portion of the filter sleeve and the lowest base surface on which the filter sleeve would be installed.

The seal 5 can be an extension of the permeable, semi permeable, impermeable, or reactive or granular filtration media used in construction of the filter sleeve to an adequate length beyond the pocketed areas at the ends of the filter sleeve so as to allow for the formation of an acceptable seal or the seal 5 can consist of a separate seal component that is attached to the filter sleeve so as to form any seal that may be required between the filter sleeve and the lower portion of the filter sleeve and supporting structure 9 interface. In some applications the seal 5 can be a disk 16 of the permeable, semi permeable, impermeable, or reactive or granular filtration media used in construction of the filter sleeve or media other than that media used in construction of the filter sleeve. This disk 16 will act as a closure for the lower opening 3 of the filter sleeve so as to embody the filter sleeve as a pouch covering the sides and lower extremes of either the interior or exterior or the interior and exterior of the supporting structure.

The weight media implemented in the weight pockets 13 and 14 can be of any type that is suitable to provide sufficient weight to facilitate a seal at the lower extreme of the filter sleeve 1 and the base of the supporting structure and also adequate to provide sufficient weight to maintain the placement of the filter sleeve on the supporting structure when the upper portion of the filter sleeve is folded either to the exterior or to the interior of the supporting structure. Weight media can be, but is not limited to, chain, sand, gravel, preformed metal rings, or any suitable media capable of sealing and/or supporting the filter sleeve in any specific application.

The weight pockets 13 and 14 can be formed by placing rows of stitching 15 spaced so as to form pockets of the desired width to accommodate the weight media to be implemented. These pockets can also be formed by gluing, thermal bonding or otherwise joining layers of the permeable media together so as to form a pocket, or pockets, of the dimension desired. The filter sleeve with weight pockets is only one embodiment of the filter sleeve and is not intended to restrict or limit the filter sleeve to include or not to include pockets since the weight application is for the formation of a seal at the lower portion of the filter sleeve when placed over a supporting structure 9 and/or as a means to provide support and stability for the filter sleeve on the supporting structure 9 by providing one means of support by folding the top portion of the filter sleeve over the top of the supporting structure 9.

A type of porous media 6 and 7 (such as a woven, non woven, or felted fabric) could be implemented in the construction of the filter sleeve, wherein the porosity of that media may vary either through implementation as a single layer or as multiple layers of a grouping of similar media depending upon the particulate size and contaminant to be addressed. The use of a plurality of different media layers enables a diversity of filtration applications to be achieved and a resultant diversity of particulate sizes and contaminants to be addressed. FIG. 2 illustrates a plurality of different layers in the filter sleeve, according to one embodiment disclosed herein. In general, each different layer will serve a specific primary function, although some layers may also perform one or more additional functions. It should be recognized that no specific number of layers are required. However, an exemplary embodiment of a particularly useful multi-layer filter sleeve can be implemented using only two layers 6 and 7, as indicated in FIG. 2.

Figure 3:
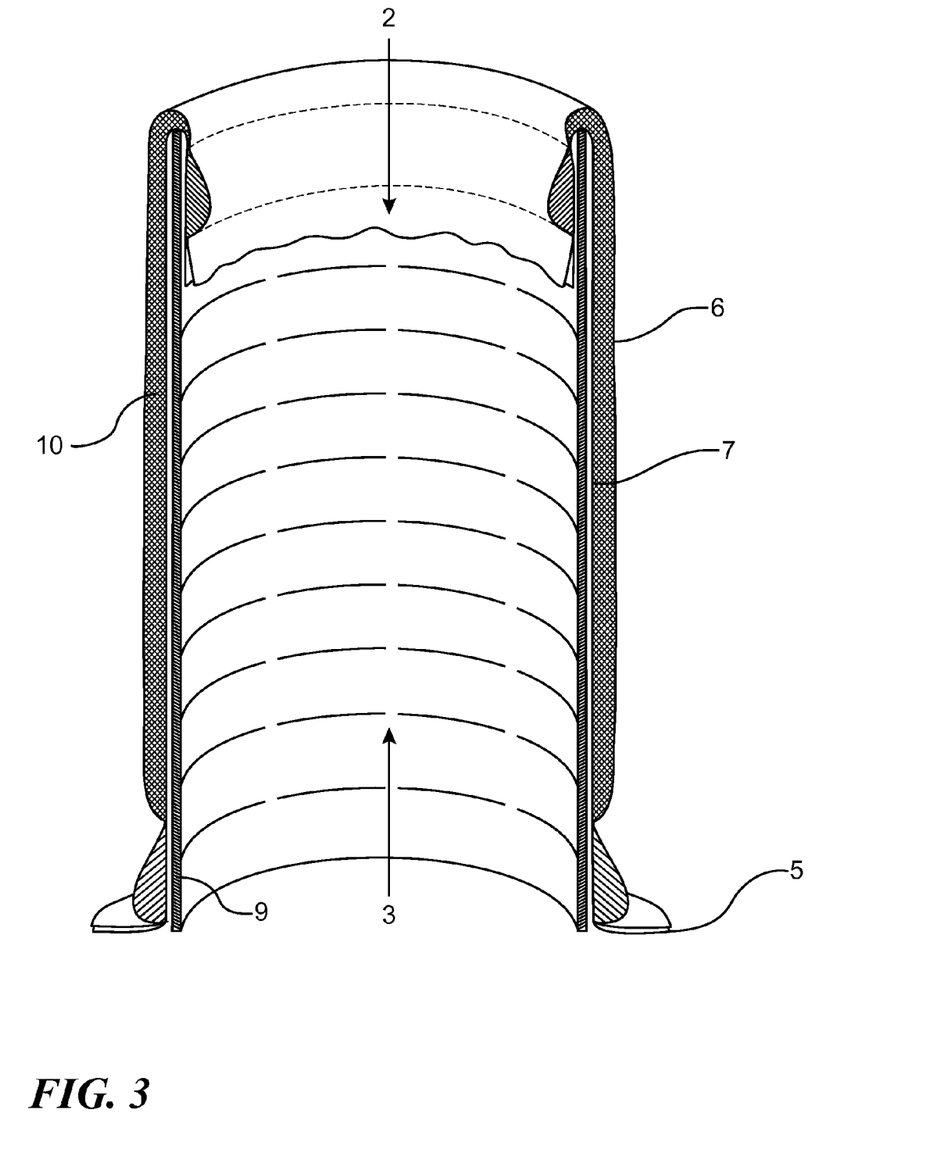
FIG. 3 illustrates a longitudinal cross-sectional view of a filter sleeve with multiple layers of permeable, semi permeable, impermeable, reactive or granular filtration media with an opening at each end of the filter sleeve's cylindrical design.

In one exemplary embodiment of the invention, multiple layers of diverse media can be implemented so as to provide the removal of particulates below 1-micron in size by one layer or a combination of layers while another layer or combination of layers removes a range of hydrocarbons while yet another layer or layers as shown in FIG. 3 incorporating granular or reactive media or surface treatment on a layer 10 can remove metals and a range of other contaminants. It should be recognized that these described layers composing the filter sleeve are intended to be exemplary, rather than limiting.

With respect to FIG. 2, it should be recognized that each of the layers can be implemented with a single layer of material, or with multiple layers of materials, either bonded together to form a single layer, or as separate layers.

FIG. 3 illustrates a cross-sectional view of the filter sleeve wherein, a layer 10 of granular media is stabilized between two layers 6 and 7 of porous media so as to increase the versatility of the filter sleeve's particulate and contaminant removal capabilities. The layer 10 shown can be a single layer media or a multi layered media or a plurality of single or multi layered media as may be require to address the filtered removal of any target particulate or contaminant. Exemplary granular media can be, but is not limited to, activated carbon, Zeolites, reactive polymer or any other media that may be required to achieve the filtered removal of target particulates and target contaminants from the liquid.

Figure 4:
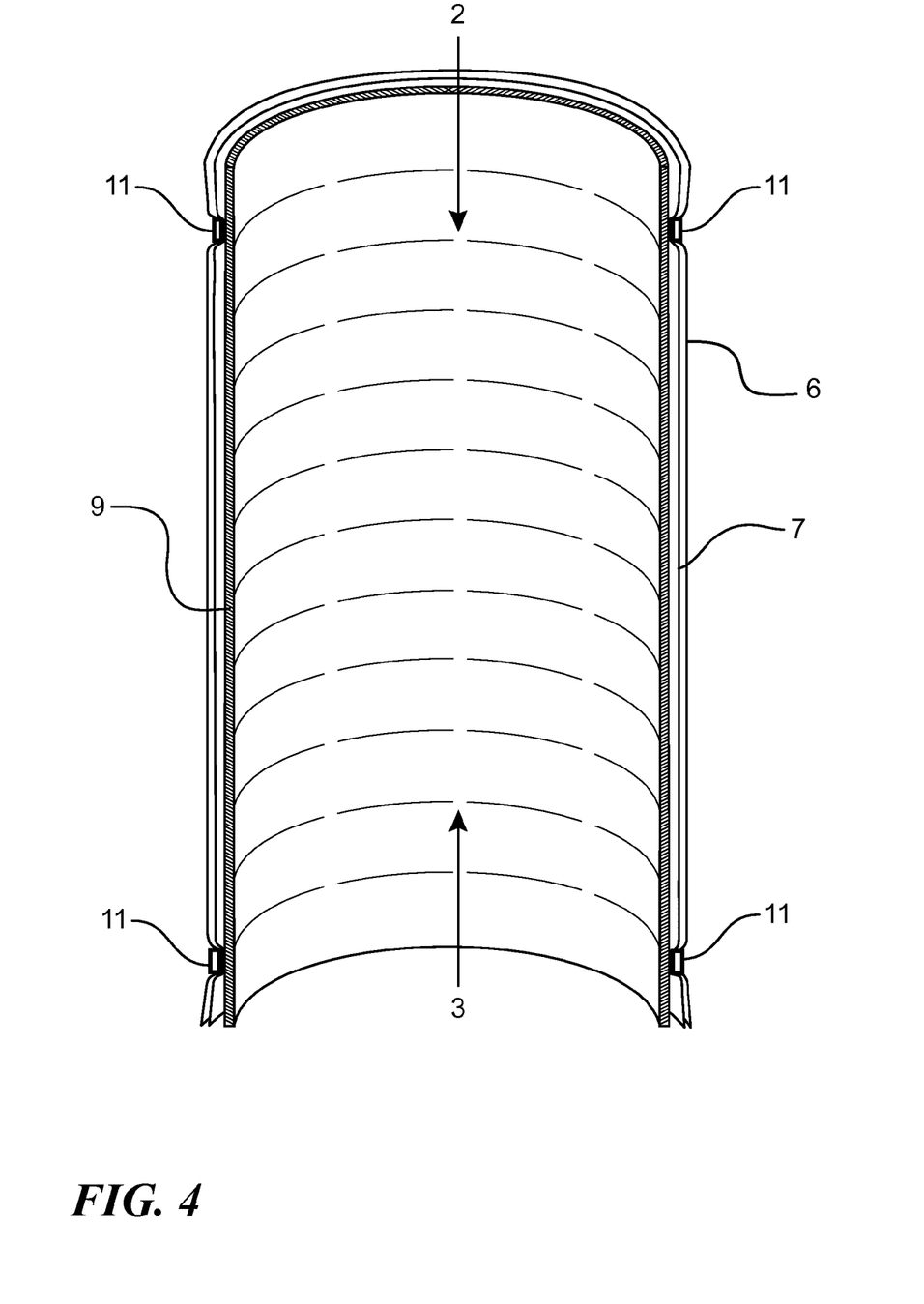
FIG. 4 illustrates a longitudinal cross sectional view of the filter sleeve with an embodiment of the invention without weighted areas adjacent to either one or both openings with the filter sleeve alternatively held in place on the supporting structure at either or both openings by clamps, ties, flanges or other physical retention devices that insure a seal is formed at the interface of the lower portion of the filter sleeve and the supporting structure and further insure that support of the filter sleeve is provided at the interface of the upper portion of the filter sleeve and the supporting structure.
Figure 5:
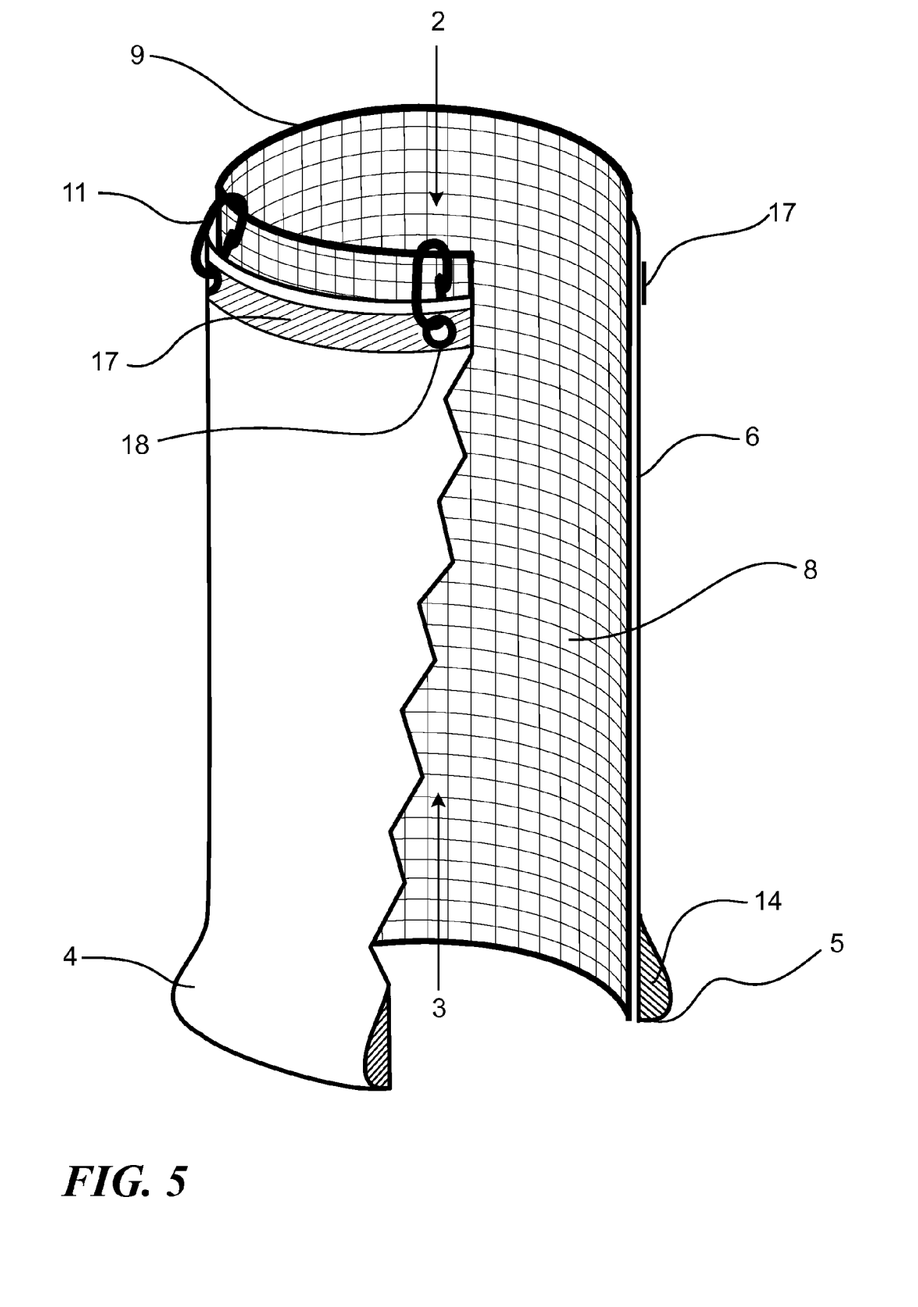
FIG. 5 illustrates a partially cutaway, longitudinal cross-sectional view of a filter sleeve with a single layer of permeable media with an opening at each end with a weighted area and a lower weight pocket adjacent to the lower opening to facilitate a gravimetric seal at the lower extreme of the filter sleeve. The upper opening of the filter sleeve is held in place on the permeable supporting structure by physical retention devices, such as grommets and spring clips, attached to the filter sleeve by grommeted holes through a reinforcing media.

FIG. 4 illustrates a cross sectional view of the filter sleeve with an embodiment of the filter sleeve without weighted areas adjacent to either one or both openings 2 and 3 with the filter sleeve alternatively held in place on the supporting structure 9 at either or both openings 2 and 3 by clamps, ties, flanges or other physical retention devices 11 that insure a seal is formed at the interface of the lower portion of the filter sleeve and the supporting structure 9 and further insure that support of the filter sleeve is provided at the interface of the upper portion of the filter sleeve and the supporting structure 9.

Filter sleeves can be specifically configured to enable waste water or other liquids to be treated in-situ and discharged into the ambient environment, in compliance with environmental discharge requirements. If a specific type of waste water or other liquid includes a specific contaminant, a filter media specifically selected to remove that contaminant can be incorporated into the filter sleeve as an additional layer, as part of one or more of the layers discussed above, or as a replacement to one or more of the layers discussed above.

Multi-layer filter sleeves can be configured to remove hydrocarbons, particulates and an unlimited range of other contaminants so that relatively clear water can be discharged directly into the environment, without violating any environmental regulations or causing aesthetic concerns. This is especially useful when removing water that has accumulated in natural or manmade structures such as electrical vaults, equipment vaults, tank vaults, and basements.

Multiple filter sleeves can be used simultaneously by fitting one Filter sleeve over another to create a multi-layered configuration of individual attached or unattached adjacent filter sleeves composing a cylindrical unit.

Multiple filter sleeves used simultaneously provides flexibility in particulate and contaminant removal. An exemplary embodiment of such an application would be wherein a situation required the removal of particulates of a dimension of 1-micron or less as well as the removal of petroleum hydrocarbons and other oils and greases from water in an underground equipment vault. If two filter sleeves are available to the user and one of the filter sleeves is configured to remove metals and petroleum hydrocarbons but not configured to remove particulates in the desired range, and the other filter sleeve is configured to remove particulates 1-micron and smaller, the filter sleeves can be placed as one cylinder within another cylinder and those two filter sleeves used simultaneously to remove the target range of contaminants and particulates.

The exemplary embodiment of the invention can include single or multiple layers of porous media 6, 7, or 10 and this porous media can, in some embodiments of the invention, consist of a layer or layers of a rigid porous media so as to make the filter sleeve self supporting as opposed to requiring a separate supporting structure. Additionally, a porous protective cover could be used to encompass the filter sleeve, to provide protection to any layers of fragile media.

The filter sleeve of the illustrated embodiment of the invention, can be deployed in a cylindrical or any other shape over or into any porous, supporting structure. It is not limited to a cylindrical shape and it can also be deployed over or into a porous supporting structure of any shape, including but not limited to, square, elliptical, trapezoidal, rectangular, etc. All that is required for deployment of the filter sleeve is that the height of the porous supporting structure allows the lower extreme of the filter sleeve to contact and seal against a base surface in the open ended embodiment and the upper extreme is fastened to or folded over the supporting structure so as to prevent the filter sleeve from collapsing vertically onto itself.

The filter sleeve can be constructed from a variety of layers and some of these layers could very well incorporate any filter media now known or later devised. The type of media does not limit the scope of present invention.

Because of its undefined tubular or sox-shaped design, the filter sleeve can be easily deployed over or into any porous supporting structure of any shape. In the open ended embodiment the weighted upper and lower ends of the filter sleeve have the ability to provide a seal on one end and support on the other end.

The fact that the filter sleeve can be essentially "made-to-order" comprising a limitless combination of media layers to address particular contaminants of concern. For example, the illustrated embodiment could be supplied in the form of a kit, where the user combines or selects filter layers to be included in the filter sleeve at the utilization site to meet the specification filtration requirements of the application on hand.

Because of its universal size, shape and fitting, the filter sleeve is particularly amenable to simple, or emergency, deployment in vaults, sumps, catch basins or other water retention areas either natural or manmade, namely the filter sleeve easily conforms to almost any filtration envelope which might be presented in an emergency situation. Deployment can be on either a long or short term basis.

In summary, the illustrated embodiment of the invention is a filter sleeve for placement over an exterior or into an interior of a supporting structure in a water or waste water discharge apparatus comprising at least one layer of media forming an enclosure about the supporting structure with an opening at each end of the enclosure, and a secured area adjacent to at least one of the openings to facilitate a seal at the lower one of the ends when the filter sleeve is deployed, or the secured area adjacent to the upper one of the ends adapted to being folded from the exterior to the interior of the supporting structure, or folded from the interior to the exterior of the supporting structure to provide retention of the filter sleeve on the supporting structure.

In one embodiment the secured area further comprises clamps, ties, flanges or other physical retention devices for insuring a seal is formed at the interface of the lower portion of the filter sleeve and the supporting structure and for insuring that support of the filter sleeve is provided at the interface of the upper portion of the filter sleeve and the supporting structure.

In another embodiment the secured area further comprises weighted areas adjacent the openings at the ends of the enclosure for insuring a gravimetric seal is formed at the interface of the lower portion of the filter sleeve and the supporting structure and for insuring that support of the filter sleeve is provided at the interface of the upper portion of the filter sleeve and the supporting structure.

The layer of media is permeable, semipermeable, impermeable or reactive.

The lower one of the openings is closed using a disk or a shaped piece of the permeable, semi permeable, impermeable, or reactive or granular filtration media or simply by sewing or otherwise binding the lower one of the openings to embody the enclosure as a pouch covering the sides and lower portions of either the interior or the exterior of the supporting structure.

The illustrated embodiment of the filter sleeve further comprises multiple different layers forming the enclosure comprising exterior and interior media layers arranged and configured to remove particulate matter and target contaminants such as, but not limited to, hydrocarbons, and at least one intermediate media layer between the outside media layers and arranged and configured to remove one or more target contaminants including smaller particulates and target contaminants.

The intermediate media layer is comprised of a support media formed from a plastic or metal screen or other self-supporting material.

The illustrated embodiment of the filter sleeve further comprises a pocket defined in the enclosure at one or both ends adjacent to the opening and encircling the opening for the placement of a weight including chain, gravel, sand, metal rings and liquids.

The illustrated embodiment of the filter sleeve further comprises a porous structural support member included within the enclosure.

The illustrated embodiment of the filter sleeve further comprises an exterior or interior protective layer of porous material fabricated to provide a durable covering.

The media is arranged and configured to remove metals.

The media is arranged and configured to remove or reduce concentrations of bacteria, algae, mold, and fungus.

The media comprising an encasement holding a granular filter media including Zeolites, activated carbon, or other filter material.

The illustrated embodiment of the invention is also a method of treating water or waste water discharge comprising the steps of providing a filter sleeve adapted for placement over an exterior or into an interior of a supporting structure in a waste water discharge apparatus, forming an enclosure about the supporting structure, the enclosure having two ends and having an opening at least one end, sealing a lower one of the two ends when the filter sleeve is deployed over or into the supporting structure, folding an upper one of the two ends adapted from the exterior to the interior of the supporting structure, or from the interior to the exterior of the supporting structure to provide retention of the filter sleeve on the supporting structure, and discharging water or waste water from the water or waste water discharge apparatus after filtration through and/or treatment by the filter sleeve.

The step of discharging water or waste water after filtration through and/or treatment by the filter sleeve the waste water apparatus comprises discharging from an electrical equipment vault.

The step of discharging water or waste water after filtration through and/or treatment by the filter sleeve the water or waste water apparatus comprises discharging from an underground equipment vault.

The step of discharging water or waste water after filtration through and/or treatment by the filter sleeve the water or waste water apparatus comprises discharging from a sump, catch basin, drain or similar below ground structure.

The step of discharging water or waste water after filtration through and/or treatment by the filter sleeve the water or waste water apparatus comprises discharging from an above ground vault, holding tank, pond, ditch and other above ground vessel, whether portable or stationary and whether naturally formed or man-made.

The step of discharging water or waste water after filtration through and/or treatment by the filter sleeve further comprises removing contaminants and particulates from contaminated water or waste water, other liquids from a source that may contain a target contaminant or particulate matter.

The step of discharging water or waste water after filtration through and/or treatment by the filter sleeve further comprises discharging or processing the water or waste water from naturally occurring events including flood, tidal surge or storm waters.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for removing contaminated water from an underground containment in an environmentally safe manner comprising:

providing a porous supporting structure defining a volume therein and having opposing open ends;

coextensively coupling a filter sleeve to the outer surface of the porous supporting structure to define an enclosure, the filter sleeve having a weighted pocket portion;

submerging the enclosure into the contaminated waste water present within the underground containment;

gravimetrically sealing one of the opposing open ends of the enclosure to a bottom surface of the underground containment using the weighted pocket portion, such that the volume is sealed off and separated from the rest of the underground containment having contaminated water therein by the enclosure;

pumping water from within the volume out of the underground containment, thereby causing contaminated water to flow through the filter sleeve and porous supporting structure into the volume producing treated water; and discharging the treated water directly into an ambient environment while retaining the contaminants within the filter sleeve.

2. The method of claim 1 where causing contaminated water to flow through the filter sleeve and porous supporting structure comprises causing contaminated water to flow through a plurality of media layers in the filter sleeve.

3. The method of claim 1 further includes selectively removing target contaminants from the contaminated water.

4. The method of claim 3 where selectively removing target contaminants from the contaminated water comprises removing particulates and hydrocarbons.

5. The method of claim 1 where coextensively coupling a filter sleeve to the porous supporting structure comprises coupling at least one end of the filter sleeve to the porous supporting structure by means of a plurality of physical retention devices.

6. The method of claim 1 where producing the treated water comprises producing treated water acceptable for discharge into a sanitary sewer system.

* * * * *